B. KELLER.
MULTIPLEX MOLDING APPARATUS.
APPLICATION FILED APR. 10, 1913.
1,105,911.
Patented Aug. 4, 1914.
4 SHEETS—SHEET 3.
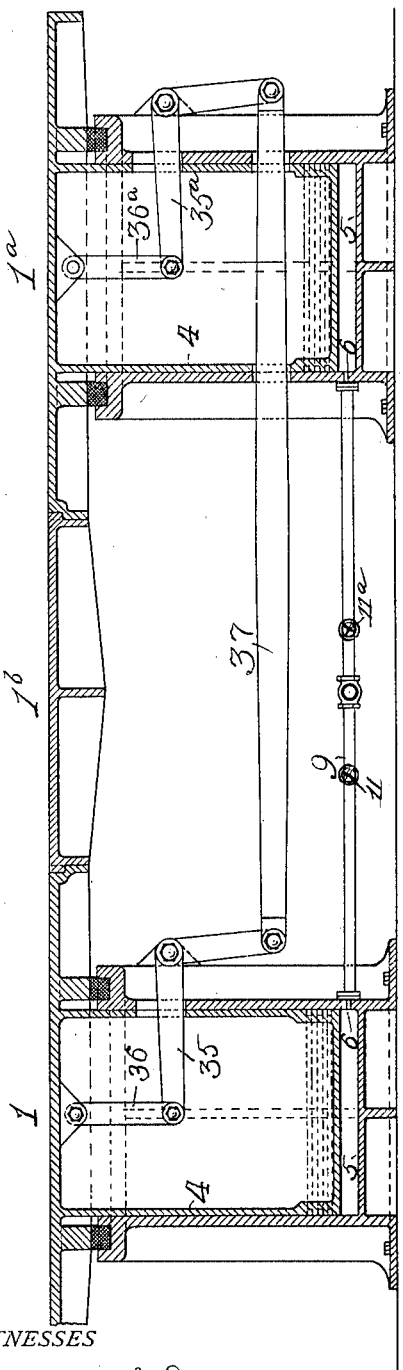
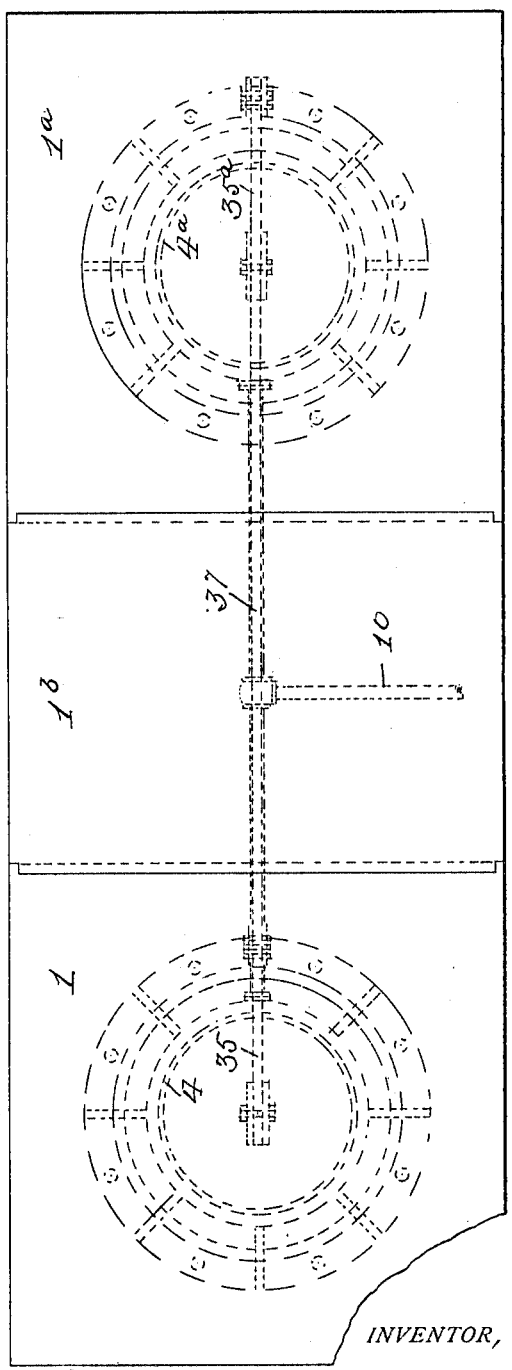

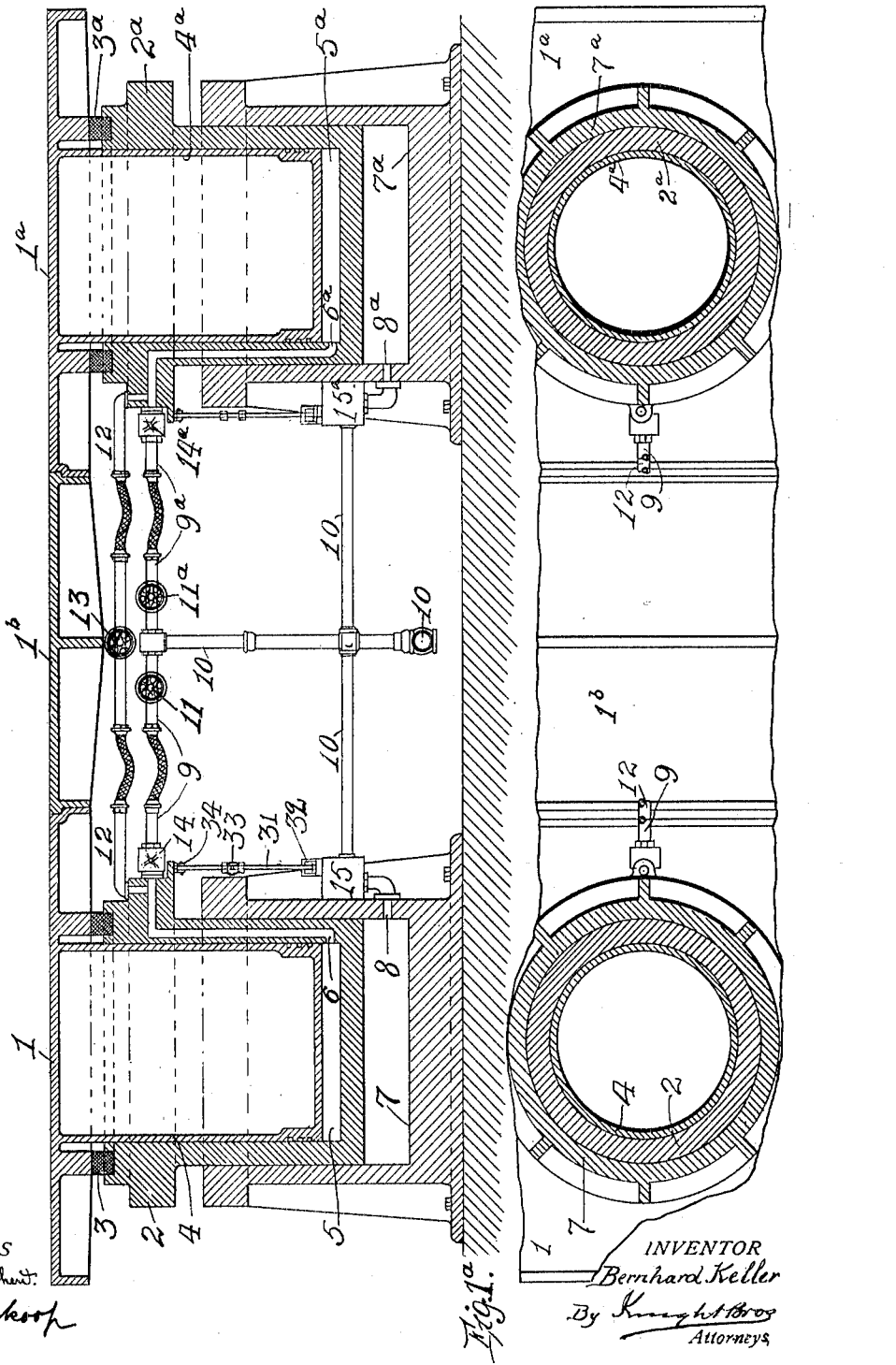

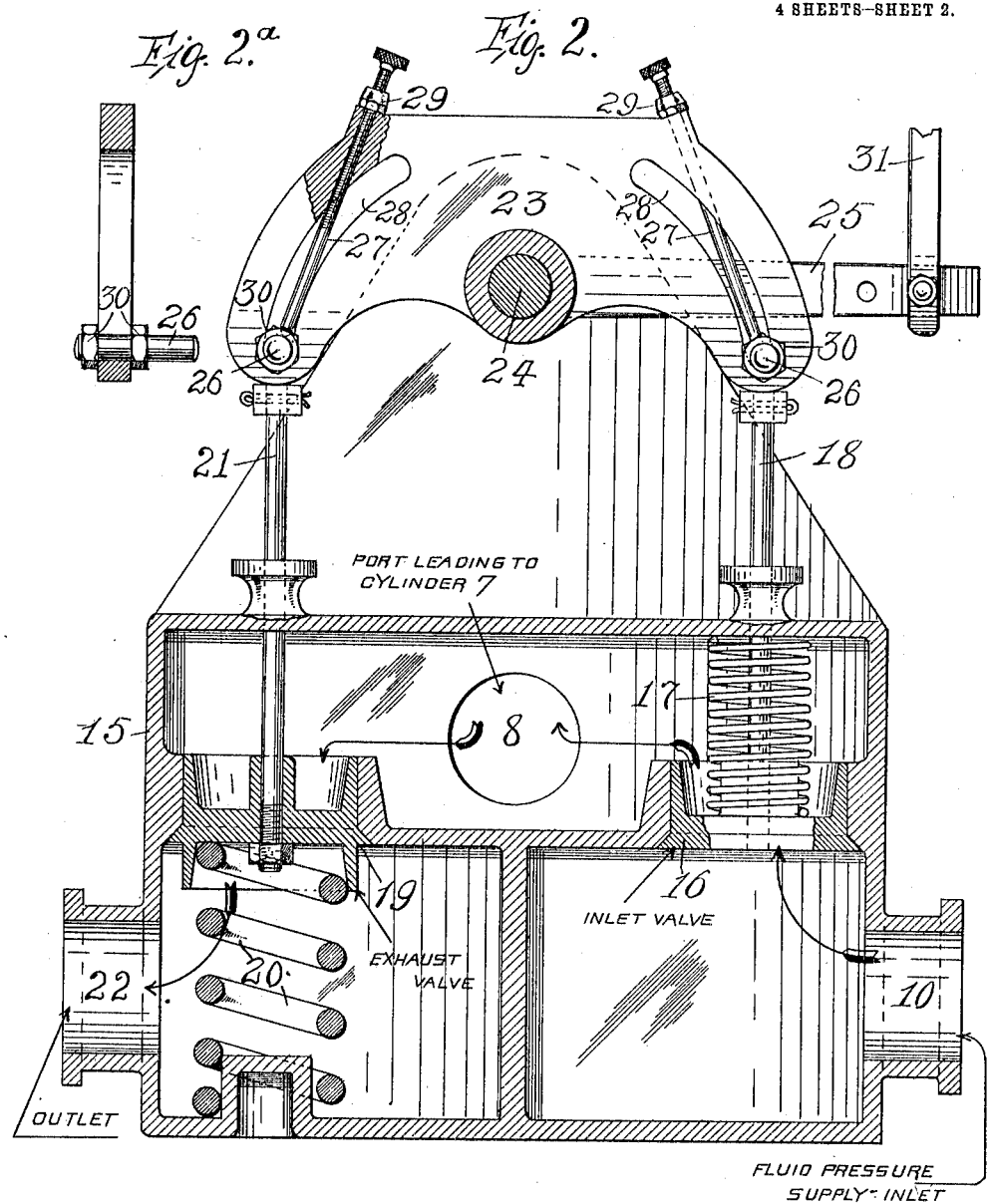

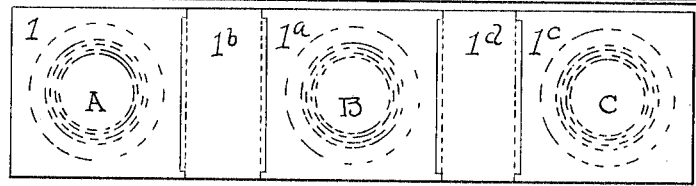
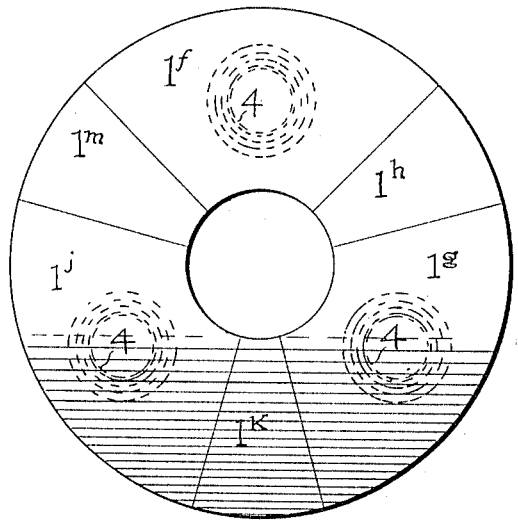

UNITED STATES PATENT OFFICE.

BERNHARD KELLER, OF DUISBURG-MEIDERICH, GERMANY.

MULTIPLEX MOLDING APPARATUS.

1,105,911.      Specification of Letters Patent.      Patented Aug. 4, 1914.

Application filed April 10, 1913. Serial No. 760,217.

*To all whom it may concern:*

Be it known that I, BERNHARD KELLER, a subject of the Emperor of Germany, and resident of 75 Sommerstrasse, Duisburg-Meiderich, Germany, have invented certain new and useful Improvements in Multiplex Molding Apparatus, of which the following is a specification.

This invention relates to apparatus for use in producing molds in condition to receive the molten metal in foundry work, particularly molds for very large castings, and it comprises means for jarring the forms for the purpose of settling the sand in the mold; and means for transporting the mold to and from the jarring machine and other parts of the apparatus, such as the roll-over and stripping means, the place of charging, etc.

Jarring machines for packing molds for large castings are not only expensive to produce, but expensive to operate; hence it is desirable to perform the work of packing the mold, so far as practicable, with a jarring machine that is commensurate with the dimensions of the work. But the space occupied wtih a plurality of individual machines of different capacity, together with the appurtenant apparatus for delivering the molds to and from such machines, is a very important consideration.

One feature of the present invention relates to the production of a multiplex jarring machine made up of any desired number of units adapted to be coupled up for work as a single unit for very large work, but readily separable in order to permit one or more of the units to be operated independently of the rest as the dimensions of the work may require, or to permit the units to be operated simultaneously but independently for the purpose of multiplying the capacity for small work. This part of the invention further relates to certain means whereby the units of the jarring apparatus, when coupled together, may be forced to operate uniformly, notwithstanding each acts in response to its own individual power.

For the sake of economizing in power, it is very desirable to avoid lifting the mold to and from the jarring and other apparatus to which it is to be subjected in the process of completing the mold.

One feature of the present invention, therefore, relates to the carriage for supporting the mold and the track upon which this carriage travels, and consists in adapting the carriage to be received by the apparatus (*e. g.* the jarring machine), and in adapting a portion of the track adjacent to the apparatus to which the mold is to be subjected, particularly the jarring apparatus, to be withdrawn from supporting relation to the carriage, so as to leave the carriage together with the mold fully subject to the effect to be produced by the apparatus, without removing the mold from the carriage.

To further economize in the expenditure of power in carrying out the process of preparing the mold, it is desirable to adapt the mold to be inverted, to permit withdrawal of the pattern without removal from the carriage.

Another feature of the invention, therefore, relates to the roll-over or inverting apparatus, and consists in providing the carriage with means whereby the plate for receiving the mold may be blocked up preliminary to inversion.

The invention will be fully understood upon reference to the accompanying drawings, in which—

Figures 1 and 1ª are, respectively, a vertical section and a horizontal section looking upward through a multiplex jarring machine, comprising two separable units; Figs. 2 and 2ª are, respectively, a vertical sectional view and a detail view of the automatic leveling valve employed in the apparatus disclosed in Fig. 1; Figs. 3 and 4 are, respectively, a vertical section and a plan view of a means that may be employed in connection with Fig. 1 to insure synchronism of vibration in the units of the jarring machine; Fig. 5 is a view showing the association with the transport tracks, of a triple unit jarring machine; Fig. 6 is a plan view showing the relation of three units of a jarring machine associated in annular series and coupled together to adapt them to serve for jarring a circular mold of large dimensions.

Referring to Figs. 1 and 1ª, 1, 1ª represent the tables of two independent jarring machines, constructed to receive a connecting leaf 1ᵇ to transform the tables in effect into one large table; said leaf being removable to leave each primary table in proper form to serve independently. These tables are supported on frames 2, 2ª, against which they abut through the medium of cushions 3, 3ª for the purpose of jarring the sand in the molds in a well known manner; the tables being guided in the frames 2, 2ª by means of pistons 4, 4ª working in cylinders 5, 5ª, in response to the supply and exhaust of fluid pressure medium through the ducts 6, 6ª. The frames 2, 2ª are themselves constructed in the form of pistons and fitted in cylinders 7, 7ª, in which said frames are adapted to be supported at any desired height by fluid pressure introduced through the ports 8, 8ª for the combined purpose of affording a shock absorbing support for the frames and raising the table 1, 1ª, 1ᵇ to the desired height to receive the mold. The cylinders 5, 5ª are supplied through pipes 9, 9ª connected with the fluid pressure supply 10, and these pipes are provided with valves 11, 11ª, so as to permit or prevent the flow of pressure medium according as the different uses of the apparatus hereinafter described may require. 12 represents a bypass pipe controlled by a valve 13 connecting the ducts 6, 6ª around the valves 11, 11ª. 14, 14ª represent valves of any suitable known type for the purpose of controlling the supply and exhaust of pressure medium in the cylinders 5, 5ª. 15, 15ª represent automatic supply regulating valves for the pressure medium, whereby the frames 2, 2ª are maintained at a constant and equal level predetermined by adjustment of the connections which operate said valves.

Referring to Figs. 2, 2ª, the automatic valve device 15 comprises an inlet valve 16 closing under pressure from the fluid medium supply 10, but having a spring 17 opposing said pressure to reduce the force required to open the valve 16, and a stem 18 through which said valve is unseated; also an exhaust valve 19 opening with the pressure of the cylinder 7, having a relatively strong spring 20 slightly overbalancing said cylinder pressure, and a valve stem 21 through which the valve is unseated. Both the valves 16 and 19 communicate with the port 8 of the cylinder in which the frame is supported, valve 16 to admit pressure from the supply 10, and valve 19 to exhaust said pressure through the outlet 22. 23 represents a rocking yoke fulcrumed at 24 and controlled by a rock arm 25 carrying adjustable studs 26 in position to encounter the valve stems 18, 21, according to the direction in which the yoke 23 is rocked. 27 represents screws for accurately defining the positions of the studs 26 in the slots 28; said screws being fixed against rotation by jam nuts 29 and said studs being rigidly held to their adjustment by lock nuts 30. 31 represents the connecting rod for raising or depressing the rock arm 25. This rod embodies the lost motion shackle 32 (Fig. 1), the turn buckle 33, and the connection 34 with the frame 2. Pressure being supplied to the pipe 10, is admitted past the valve 16 as long as the frame 2 is lower than the level at which it is desired to maintain it, by reason of the downward pressure of the rod 31 on the arm 25 and the depression of the valve stem 18 by the stud 26. When said frame reaches the proper level, valve 16 closes and the level is maintained. Should frame 2 rise above the level predetermined, the arm 25 is moved upward by the connection 31, the yoke 23 is rocked in the opposite direction, depressing valve stem 21 and opening valve 19, to permit some of the fluid pressure in the cylinder 7 to escape until the lowering of the frame 2 returns the yoke 23 to the intermediate position shown in Fig. 2.

In using the multiplex jarring machine, either one of the valves 11 or 11ª, say valve 11ª, is closed, while the other (11) is opened to admit pressure from pipe 10 past the valve 14 to the cylinder 5. Valve 13 is also opened so that the valve 14 then controls not only the pressure in the cylinder 5, but through the by-pass 12, the pressure in the cylinder 5ª. Simultaneous reciprocation is thus set up in both the units with their tables 1, 1ª, and the latter being connected by the leaf 1ᵇ, the apparatus operates as a single jarring machine of very large dimensions.

In order that the apparatus may not be out of use, or the expense of operating all of its units may not be incurred when only small work is required, the leaf 1ᵇ is removable, the by-pass 12 may be closed by the valve 13 and either of the valves 11, 11ª may be opened at will to operate the corresponding unit independently of the other, or each of said units may be operated simultaneously, but independently, and thus used for doing double the work of the single unit or of a single large machine.

As will be seen from Fig. 3, means may be provided for insuring identity in direction as well as the amplitude of motion in the movable members of the two units; an effective means for this purpose comprising the bell-crank levers 35 connected through links 36 with the tables 1 and 1ª and having a pitman 37 connecting their two lower ends; the cranks 35, 35ª being so positioned that their connections with the tables must move in the same direction.

As will be seen from Fig. 5, there may be three units 1, 1ª and 1ᶜ, with two intervening connecting leaves 1ᵇ and 1ᵈ for the tables. Or as shown in Fig. 6, the units may be arranged in annular series, the tables 1ᶠ, 1ᵍ and 1ʲ, as well as the connecting leaves 1ᵐ and 1ᵏ, in addition to the leaf 1ʰ, being in the form of segments of a circle.

I claim:—

1. A jarring machine comprising a plurality of units, each having means for independently operating it, and means uniting said units and causing them to operate as one; there being automatic leveling means combined with said units.

2. A jarring machine comprising a plurality of units, each having means for independently operating it, and means uniting said units and causing them to operate as one; there being automatic leveling means combined with said units, and means for adjusting said leveling means at will to enforce uniformity in the leveling means of the different units.

3. A jarring machine comprising a plurality of units, each having means for independently operating it, and means uniting said units and causing them to operate as one; there being automatic leveling means combined with said units, comprising inlet and outlet valves, and means controlled by the elevation of a movable part of the machine, controlling said valves.

4. A jarring machine comprising a plurality of units, each having means for independently operating it, and means uniting said units and causing them to operate as one; there being automatic leveling means combined with said units, comprising inlet and outlet valves, and means controlled by the elevation of a movable part of the machine, controlling said valves; said last-named means comprising a rocking yoke, stems for the inlet and exhaust valves coöperating with said rocking yoke, and a connection between said rocking yoke and said movable part of the machine.

5. A jarring machine comprising a plurality of units, each having means for independently operating it, and means uniting said units and causing them to operate as one; said uniting means comprising fluid pressure supplying and controlling means, and connections through which the control may be exerted on the plurality of units or on the units individually; said last-named means comprising independent valves controlling the supply and exhaust of fluid pressure to the respective units, means for cutting out one of said valves, and an independent fluid pressure conduit through which the unit of the cut-out valve is subjected to the control of the valve left in.

6. A jarring machine comprising a plurality of units, each having means for independently operating it, and means uniting said units and causing them to operate as one; means being provided to insure identity of direction and amplitude of movement of the moving parts of said units.

7. A jarring machine comprising a plurality of units, each having means for independently operating it, and means uniting said units and causing them to operate as one; means being provided to insure identity of direction and amplitude of movement of the moving parts of said units; said last-named means comprising crank levers fulcrumed in symmetrical positions, with a connection between one arm of each lever and the respective unit which it is to control, and a pitman connecting the other arms of the respective levers together.

The foregoing specification signed at Barmen, Germany, this 20th day of March 1913.

BERNHARD KELLER. [L. S.]

In presence of two witnesses:
HELEN NUFER,
JULIUS FESTNER.

---

Copies of this patent may be obtained for five cents each, by addressing the "Commissioner of Patents, Washington, D. C."